United States Patent
Thunes et al.

(10) Patent No.: US 7,906,922 B2
(45) Date of Patent: Mar. 15, 2011

(54) ELECTRIC MOTOR DRIVE EMPLOYING HYBRID, HYSTERETIC/PULSE-WIDTH-MODULATED DYNAMIC BRAKING

(75) Inventors: Jerry Dee Thunes, Greenfield, WI (US); Lixiang Wei, Whitefish Bay, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 374 days.

(21) Appl. No.: 12/061,454

(22) Filed: Apr. 2, 2008

(65) Prior Publication Data

US 2009/0251081 A1    Oct. 8, 2009

(51) Int. Cl.
*H02P 3/06* (2006.01)

(52) U.S. Cl. ......... 318/375; 318/376; 318/377; 318/378; 318/379

(58) Field of Classification Search .................. 318/375, 318/376, 377, 378, 379
See application file for complete search history.

(56) References Cited

U.S. PATENT DOCUMENTS

| | | | | |
|---|---|---|---|---|
| 5,910,892 A | * | 6/1999 | Lyons et al. | 363/98 |
| 6,058,031 A | * | 5/2000 | Lyons et al. | 363/67 |
| 6,078,156 A | * | 6/2000 | Spurr | 318/368 |
| 6,577,483 B1 | | 6/2003 | Steicher et al. | |

* cited by examiner

*Primary Examiner* — Walter Benson
*Assistant Examiner* — David S Luo
(74) *Attorney, Agent, or Firm* — Boyle Fredrickson LLP; Alexander R. Kuszewski; John M. Miller

(57) ABSTRACT

A dynamic braking circuit for an electronic motor drive shunts the DC link of the drive with a resistor using two control strategies. The first control strategy used for lower levels of braking employs a pulse width modulated signal and the second control strategy used for higher levels of braking uses a hysteretic signal significantly reducing switching losses in the semiconductor devices controlling the dynamic braking resistor allowing higher braking capacity.

19 Claims, 2 Drawing Sheets

ELECTRIC MOTOR DRIVE EMPLOYING HYBRID, HYSTERETIC/PULSE-WIDTH-MODULATED DYNAMIC BRAKING

STATEMENT REGARDING FEDERALLY SPONSORED RESEARCH OR DEVELOPMENT

N/A

CROSS REFERENCE TO RELATED APPLICATION

N/A

BACKGROUND OF THE INVENTION

The present invention relates to dynamic motor braking systems working to control the speed of an electric motor by dissipating energy generated by the motor, and in particular to a braking system using a hybrid control strategy that offers greater braking capacity and improved operation of motor drives when connected in tandem.

Motor drives control the frequency and amplitude of the electrical power applied to an electrical motor to improve motor operation, for example, by improving motor starting and stopping, motor speed and torque control, motor synchronization, load management, and energy efficiency. For this purpose, the motor drive will typically receive three-phase line power and rectify it to produce a DC bus voltage. The DC bus voltage is then received by a set of switching semiconductor devices, typically operating in a class D or switching mode, to synthesize multiphase AC electrical power from the DC bus voltage. The frequency and amplitude of the synthesized power is controlled by controlling the switching of the semiconductor devices.

When a control electrical motor must be slowed, for example against an attached inertial load, the motor may generate (termed "regeneration") electrical power that appears on the DC bus as an increased DC voltage. This voltage is reduced by a resistor (termed a dynamic braking resistor) shunting the DC bus to dissipate the excess power on the DC bus. Typically this dynamic braking resistor is connected across the DC bus by a solid-state switching device so that it can be removed when braking is not required.

Two principal techniques may be used for controlling the dynamic braking resistor in order to regulate the DC bus voltage. The first technique, termed the "hysteretic control", connects the resistor across the DC bus when the voltage on the DC bus rises above a first predetermined limit and disconnects the resistor from the DC bus when the voltage drops below a second predetermined limit. The difference between the first and second predetermined limits provides a degree of hysteresis preventing excessive switching when the DC voltage is near a limit.

While hysteretic control is simple, it has several drawbacks. First, the regulation of the DC bus voltage is rather coarse producing a voltage "ripple" that can decrease the effectiveness of the motor drive and increase power dissipation and undesired mechanical vibration. Second, often it is desired to connect the DC buses of several motor drives together (termed shared bus or common bus for DC supply configurations) for improved load sharing. When hysteretic control is used, minor differences in the switching limits of the controls will inevitably result in one dynamic braking resistor turning on at a slightly lower level than the other dynamic braking resistor and thus carrying the full burden of regulation. This unequal load sharing eventually reduces the total braking capacity of the connected drives and can result in significant circulating currents between drives.

One solution to these problems of hysteretic control is the use of "pulse width modulated" or PWM control. Under PWM control, the dynamic braking resistor is connected and disconnected across the DC bus at a high switching rate whose "duty cycle" (the relative proportion of time that the resistor is operating in a shunting capacity) depends on the voltage of the DC bus. As the voltage on the DC bus rises, the duty cycle of the dynamic braking resistor increases drawing more power from the DC bus.

The high switching rate of the dynamic braking resistor in PWM control substantially reduces the ripple in the regulation of the DC bus voltage. Further, because the duty cycle is proportional to the excess voltage (rather than on/off), small differences in the control of the dynamic braking resistor do not result in one dynamic braking resistor carrying the full burden of the regulation and any circulating currents are reduced.

Unfortunately, these advantages to PWM control come at an expense. The high switching rate of the solid-state switching device controlling the dynamic braking resistor, necessary to reduce the ripple of the DC bus voltage, increases the power dissipation of the solid-state switching device. This requires that the solid-state switching device be "de-rated", limiting the maximum amount of braking energy that can be dissipated before the rating of the solid-state switching device is exceeded.

SUMMARY OF THE INVENTION

The present inventors have recognized that the advantages of PWM control can be obtained without the need to de-rate the solid-state switching device by employing a hybrid control strategy that uses PWM control up to a certain DC bus voltage and then switching to hysteretic control. By moving to hysteretic control, the power handling capacity of the solid-state switching device is effectively increased at the point where greatest power handling is required. Further, because the hysteresis takes place only at high DC bus voltages (essentially switching between two high voltage values) the amount of ripple voltage during the hysteretic control is far less than that obtained with a pure hysteretic control system. Switching to hysteretic control via pulse dropping lowers the switching frequency with only a small increase in bus voltage ripple.

Specifically then, the present invention provides a dynamic braking controller for a motor drive, the motor drive using a voltage on a DC bus and the DC bus communicating with an inverter providing controlled power to an electric motor. The invention includes a series connected resistor and solid-state switching device, the two shunting the DC bus. A control circuit controls the solid-state switching device so that for larger energy dissipation, the solid-state switching device is controlled in a hysteretic mode in which the solid-state switching element is turned fully on for DC bus voltages only above a predetermined threshold. For smaller energy dissipation, the control circuit controls the solid-state switching element in a pulse width modulation mode wherein the solid-state switching element is repeatedly switched on and off with an on-time being a function of DC bus voltage.

It is thus one object of the invention to tailor the control of the dynamic braking according to the amount of energy that must be dissipated. For high energies that may tax the solid-state switching element, a more efficient hysteresis mode is used, while for lower energies better regulation and improved tandem operation are obtained using pulse width modulation.

The pulse width modulation mode may provide a substantially continuous control of pulse width as a function of DC bus voltage and the hysteresis mode may provide a discontinuous function of pulse width as a function of DC bus voltage. In the pulse width modulation mode, the pulse width modulation need not be controlled by a proportional controller (accepting an input of bus voltage) but any control strategy may be used, for example, a proportional, integral, derivative control strategy.

It is thus another object of the invention to provide improved voltage regulation with PWM control within the power dissipation limits of the solid-state switching device, while still providing a large range of control available with hysteretic control.

The control circuit may control the solid-state switching device in a first mode below a threshold DC bus voltage by switching the solid-state switching device at a first average rate to control the average on-time of the solid-state switching device, and in a second mode above the threshold DC bus voltage by switching the solid-state switching device at a second average rate less than the first average rate to control the average on-time of the solid-state switching device to be greater than the average on-time in the first mode.

It is thus another object of the invention to reduce switching losses in the solid-state switching devices, as greater power dissipation must be achieved. By reducing switching losses, a larger switching device current may be achieved with the same junction temperature, leading to a larger current applied to the dynamic braking resistor. Thus, although the power dissipated in the solid-state switches is reduced, the total power dissipated in the braking resistor is increased by a much greater amount.

In the first mode, the control circuit may provide pulse width modulation of the solid-state switching device as a continuous function of DC bus voltage up to a maximum duty cycle and in the second mode may alternate between holding the solid-state switching device in an on-state and switching the solid-state switching device at the maximum duty cycle, in effect, pulse dropping as the maximum duty cycle is exceeded.

It is thus an object of the invention to reduce the ripple voltage that occurs in a hysteresis mode by switching not between on and off but between on and a switched on/off state.

The first average rate may be greater than 1 kHz and the second average rate may be less than 1 kHz. For example, the first average rate may be substantially 2 kHz and the second average rate may be substantially in a range of 50 to 200 Hz. The importance is the substantial difference between the two frequencies.

Thus it is an object of the invention to provide for significant differences in switching frequency and thus in switching loss in the two control modes.

The control circuit may switch the solid-state switching device off in a third mode at a second DC bus voltage less than the threshold DC bus voltage.

Thus it is an object of the invention to provide a mode having no switching losses when dynamic braking does not occur.

The maximum duty cycle of the pulse width modulation mode may be substantially 0.8-0.9.

It is thus an object of the invention to switch away from PWM mode when switching losses will be significant because of high current draw.

The invention may further include a second (or more) motor drive(s) having a second DC bus communicating with a second inverter providing control power to a second electric motor where the first and second DC buses are electrically interconnected for power-sharing. The second motor drive may further include a second dynamic braking controller having a second series connected resistor and second solid-state switching device shunting the second DC bus. Both of the solid-state switching devices may be operated to:

(a) control the solid-state switching devices in a hysteresis mode wherein the solid-state switching elements are turned on for DC bus voltages above the predetermined threshold; and (b) control the solid-state switching devices in a pulse width modulation mode wherein the solid-state switching elements are repeatedly switched on and off with an on-time being a function of DC bus voltage for DC bus voltages below the predetermined threshold.

It is thus another object of the invention to provide a dynamic braking system that works well with tandem connected motor drives or drive systems where a common converter supplies a DC bus to a system of two or more drives.

These particular features and advantages may apply to only some embodiments falling within the claims and thus do not define the scope of the invention.

DETAILED DESCRIPTION OF THE PREFERRED EMBODIMENT

Figure 1:
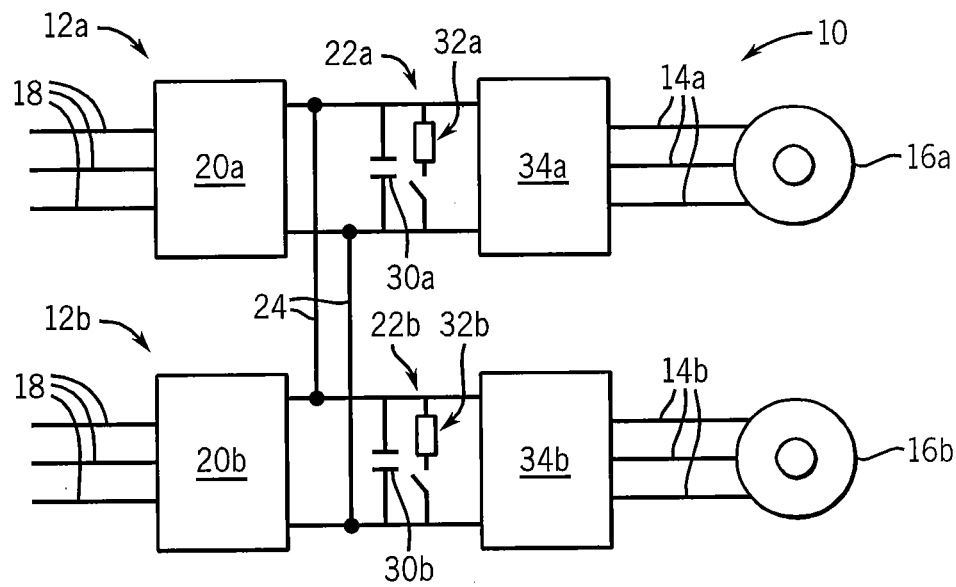
FIG. 1 is a block diagram of two motor controllers having joined DC buses as may be used with the present invention.
Figure 2:
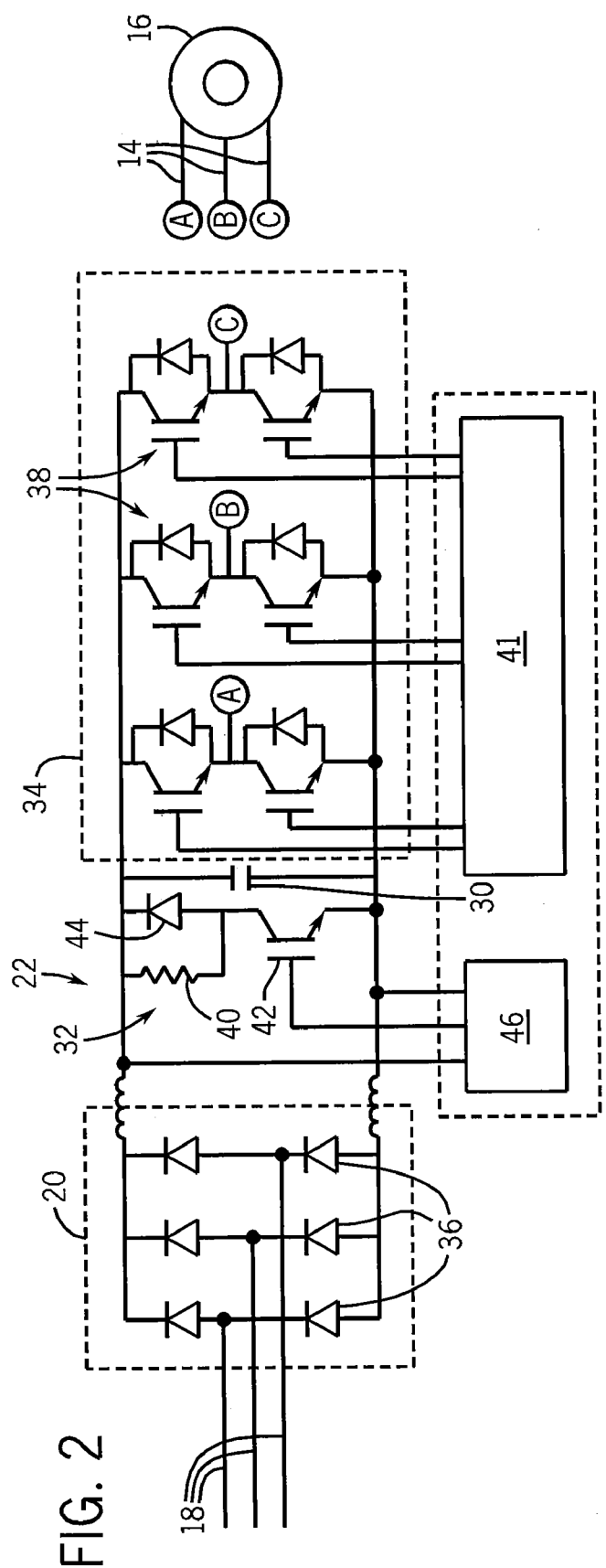
FIG. 2 is a detailed schematic diagram of the motor controllers of FIG. 2 showing a dynamic braking resistor and associated solid-state switching element.

Referring now to FIG. 1, a motor control system 10 may include a first motor drive 12a and a second motor drive 12b each providing controlled three-phase power 14a and 14b to respective motors 16a and 16b. The motors 16a and 16b may, for example, be 50 hp or 15 hp motors drawing as much as 65 or 22 amps at approximately 460 VAC RMS or approximately 650 VDC. Referring to FIGS. 1 and 2, motor drives 12a and 12b may receive three-phase power 18 at respective rectifiers 20a and 20b to produce DC power on DC links 22a and 22b. Sometimes, the drives may also be used as a common DC bus configuration where its power is drawn from a common DC bus without rectifier circuit enabled. As shown in FIG. 2, the rectifier 20 may, for example, be a bridge of diodes 36 rectifying the three-phase power 18 into a high voltage (approximately 650 VDC) on the DC link 22. The DC links 22a and 22b may be shunted by link capacitors 30a and 30b respectively which provide for energy storage.

Power from the DC links 22a and 22b is received by inverters 34a and 34b which produce the control power 14a, 14b. The inverters 34 generally provide a series of solid-state switches 38 (shown here with flyback diodes) that may be controlled by a switch controller 41 of a type well known in the art, for example, a PWM or direct torque controller, to provide for the power 14 to the motor 16.

The DC links 22a and 22b of motor drives 12a and 12b may be joined in parallel by conductors 24 to allow load sharing so that one rectifier 20a, for example, may provide power to motor 16b under high demand situations and vice versa or so that power may be shared when one drive is motoring and the other drive is regenerating power to conserve power or when overhauling loads occur. For example, the dynamic braking of the present invention could be used in situations where both motors would regenerate at the same time in an emergency stop situation. It will be understood that additional motor drives 12 beyond two may be connected in this manner and that the present invention is applicable to other than emergency stopping situations or situation where both motors are regenerating.

Each DC link 22a and 22b may also include a dynamic braking circuit 32a and 32b connected to the three-phase power 18 to limit the voltage on the bus when the drives are regenerating. As shown best in FIG. 2, each dynamic braking circuit 32 may include a dynamic braking resistor 40 in series with a solid-state switching device 42 (such as an insulated gate bipolar transistor (IGBT)) and in parallel with a flyback diode 44 of a type well known in the art.

The resistor 40 and solid-state switching device 42 are connected in series to shunt the DC link 22 when the solid-state switching device 42 is closed and thereby to dissipate power in the capacitors 30 and generally lower the voltage of the DC link 22. By shunting the DC link 22 with the resistor 40, energy from the motor 16 during braking that is accumulated in the capacitor 30 may be extracted and dissipated.

The solid-state switching device 42 is controlled by a signal from a dynamic braking controller 46 which may, for example, be a separate circuit or incorporated into controller 41 and which may be discrete circuitry or a programmed microcontroller of a type well known in the art. The dynamic braking controller 46 also receives electrical signals from the DC link 22 providing for a measurement of the voltage of the DC link 22.

Figure 3:
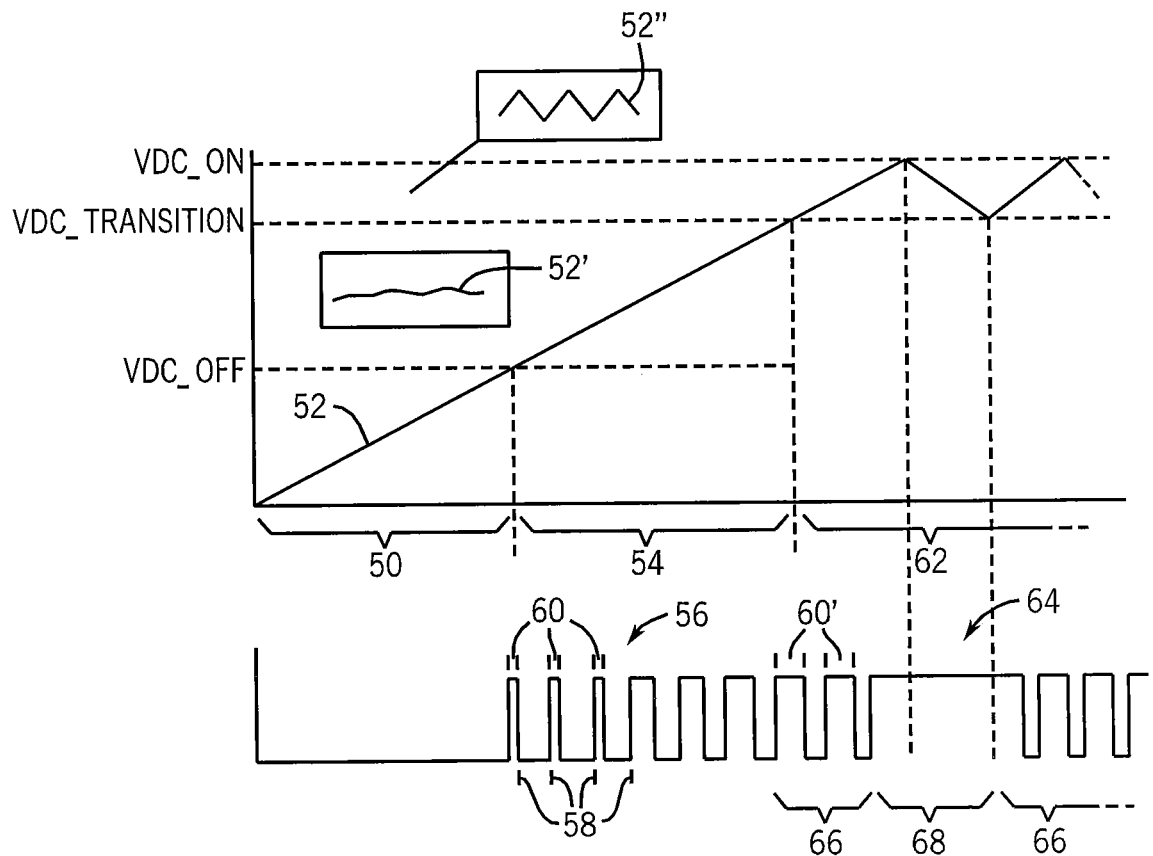
FIG. 3 is a graph of DC bus voltage versus time aligned with a similar graph of control voltage for the solid-state switching element of the present invention showing the different control modes.

Referring now to FIG. 3, the dynamic braking controller 46 of the present invention executes a hybrid control strategy for controlling the solid-state switching device 42 and thus the power dissipation applied to the DC link 22. The hybrid control strategy provides for three generally controlled regimes that may be triggered by the voltage of the DC link 22. In a first control range 50, for DC bus voltages 52 ($V_{bus}$) less then $V_{dc\_off}$, no signal is provided by the dynamic braking controller 46 to the solid-state switching device 42 so that the solid-state switching device 42 remains in an off or open state. In this condition the resistor 40 is disconnected from the DC link 22 and no power is dissipated by the dynamic braking circuit 32. In this case the duty cycle d of a control signal to solid-state switching device 42 is effectively zero per the following equation (1):

$$d=0 \text{ for } V_{bus} < V_{dc\_off} \quad (1)$$

In a second control range 54 for DC bus voltages 52 above $V_{dc\_off}$ and less than $V_{dc\_transition}$, the dynamic braking controller 46 provides a control signal to solid-state switching device 42 producing a pulse width modulation 56 switching the solid-state switching device 42 between a low state holding the solid-state switching device 42 off and a high state turning the solid-state switching device 42 on. The switching occurs at a regular switching frequency 58 typically being approximately 2 kHz. The on-times 60 of the pulse width modulation 56 provide a duty cycle that is a continuous function of the DC bus voltages 52 in the range between $V_{dc\_off}$ and $V_{dc\_transition}$ per the following equation (2):

$$d = d_{max} \frac{V_{bus} - V_{dc\_off}}{V_{dc\_transition} - V_{dc\_off}} \text{ for } V_{dc\_off} < V_{bus} < V_{dc\_transition} \quad (2)$$

where $$d_{max} = \frac{V_{transition} - V_{dc\_off}}{V_{dc\_on} - V_{dc\_off}}. \quad (3)$$

The maximum duty cycle $d_{max}$ will typically be about 0.8-0.9 as determined generally from the switching device thermal limit and the difference between the switching and conductions losses. $V_{transition}$ may be for example around 750 V. More generally, the maximum duty cycle will be the difference between switching losses in the PWM operation and conduction losses in the switching device. The continuous control function exercised in the second control range 54 minimizes ripple in the DC bus voltage 52'.

In a third control range 62, the dynamic braking controller 46 provide a control signal to solid-state switching device 42 producing a hysteretic control signal 64 varying between a first state 66 and second state 68. In the first state 66 the control signal provides a constant on-time 60' providing a duty cycle equal to $d_{max}$. In the second state 68 the control signal provides a continuously on signal having a duty cycle of one so that the solid-state switching device 42 is held on without switching effectively dropping pulses resulting in the elimination of switching losses for a given period and thus a lowering of the switching frequency.

The dynamic braking controller 46 determines the state 66 or 68 according to the last threshold of $V_{transition}$ and $V_{dc\_on}$ that the DC bus voltage 52 reached. Thus, for example, as the DC bus voltage 52 rises through $V_{dc\_transition}$ it switches to state 66 and remains there until the DC bus voltage 52 reaches $V_{dc\_on}$ at which point it switches to state 68 until the DC bus voltage 52 again drops to $V_{dc\_transition}$. At that point, the control circuit switches to state 68 and remains there until $V_{bus}$ drops to less than $V_{dc\_transition}$ upon which the control circuit again switches to state 66. This system provides for switching hysteresis. Because the hysteretic control signal 64 varies between fully on and a pulsed operation, the ripple in the DC bus voltage 52" in this third control range 62 is much reduced with respect to normal hysteretic control. In third control range 62 the duty cycle is thus controlled per the following equation (4):

$$d = \begin{cases} d_{max} \\ 1 \end{cases} \quad (4)$$

Figure 4:
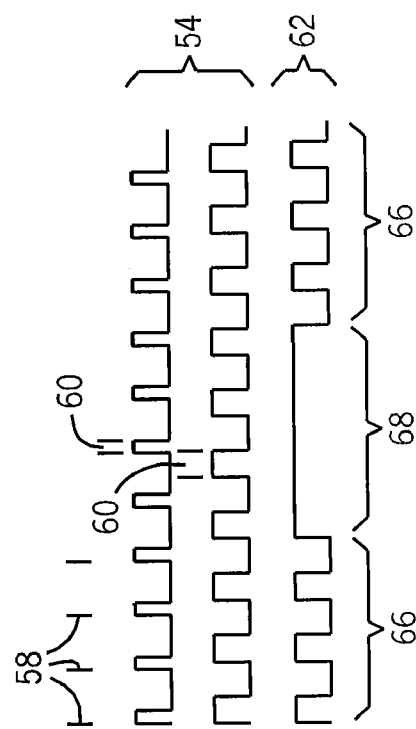
FIG. 4 is a set of plots of the control voltage for different control modes showing effective different average switching frequencies.

Referring now to FIG. 4, it will be seen that in the second control range 54, the average switching frequency 58 is constant and only the duty cycle (on-time 60) changes. In contrast, in third control range 62, the average switching frequency varies being an average of switching frequency 58 (of state 66) and switching frequency 58 of zero in state 68. Because average switching frequency in the third control range 62 is typically 50 to 200 Hz and much less than the switching frequency 58 (2 kHz) of second control range 54, switching losses (e.g., power lost when the solid-state switching device 42 is neither at near-infinite nor near-zero resistance) are much reduced allowing continued operation of the solid-state switching device 42 at higher voltages and higher on-time (duty cycle) producing greater power dissipation and thus greater braking effect as the DC link voltage increases. As will be understood to those of skill in the art, this power dissipation is power taken from the load (motor 16) and dissipated as heat in the braking resistor 40

The functionally continuous control of the solid-state switching device 42 through most of second control range 54, where small areas in measurement result in only small differences in duty cycle, allows good sharing of braking responsibilities between the solid-state switching device 42 of the two motor drives 12*a* and 12*b*.

It is specifically intended that the present invention not be limited to the embodiments and illustrations contained herein, but include modified forms of those embodiments including portions of the embodiments and combinations of elements of different embodiments as come within the scope of the following claims.

We claim:

1. A dynamic braking controller for a motor drive having voltage on a DC bus communicating with an inverter providing controlled power to an electric motor, the dynamic braking controller comprising:
   a resistor;
   a solid-state switching device connected in series with the resistor, wherein the solid-state switching device is configured to selectively connect the resistor across the DC bus; and
   a control circuit configured to control the solid-state switching device that in a first mode below a threshold DC bus voltage, switches the solid-state switching device at a first average rate to control an average on-time of the solid-state switching device, and in a second mode above the threshold DC bus voltage, switches the solid-state switching device at a second average rate less than the first average rate to control the average on-time of the solid-state switching device to be greater than the average on-time in the first mode.

2. The dynamic braking controller of claim 1 wherein in the first mode the control circuit provides pulse width modulation of the solid-state switching device as a continuous function of DC bus voltage up to a maximum duty cycle, and in the second mode alternates between holding the solid-state switching device in an on state and switching the solid-state switching device at the maximum duty cycle.

3. The dynamic braking controller of claim 1 wherein the first average rate is greater than 1 kHz and the second average rate is less than 1 kHz.

4. The dynamic braking controller of claim 3 wherein the first average rate is substantially 2 kHz and the second average rate is substantially in a range of 50 to 200 Hz 5. The dynamic braking controller of claim 1 wherein the control circuit turns the solid-state switching device off in a third mode at a second DC bus voltage less than the threshold DC bus voltage.

6. The dynamic braking controller of claim 1 wherein a maximum duty cycle of the first mode is substantially in the range of 0.8-0.9.

7. The dynamic braking controller of claim 1 further including a second motor drive having a second DC bus communicating with a second inverter providing control power to a second electric motor; and further including a second dynamic braking controller comprising:
   a second resistor;
   a second solid-state switching device connected in series with the second resistor, wherein the second solid-state switching device is configured to selectively connect the second resistor across the second DC bus; and
   a second control circuit configured to control the second solid-state switching device that, in a first mode below the threshold DC bus voltage, switches the second solid-state switching device at the first average rate to control the average on-time of the second solid-state switching device, and in a second mode above the threshold DC bus voltage switches the second solid-state switching device at the second average rate less than the first average rate to control the average on-time of the second solid-state switching device;
   wherein the first and second DC buses are electrically interconnected for power-sharing.

8. A dynamic braking controller for a motor drive using a DC bus communicating with an inverter providing controlled power to an electric motor, the dynamic braking controller comprising:
   a resistor;
   a solid-state switching device connected in series with the resistor, wherein the solid-state switching device is configured to selectively connect the resistor across the DC bus; and
   a control circuit configured to control the solid-state switching device in a hysteresis mode wherein the solid-state switching element is turned fully on only for DC bus voltages above a predetermined threshold and in a pulse width modulation mode wherein the solid-state switching element is repeatedly switched on and off with an on-time being a function of DC bus voltage; and
   wherein the hysteresis mode is used for greater energy dissipation in the series connected resistor than the pulse width modulation mode.

9. The dynamic braking controller of claim 8 wherein the pulse width modulation mode provides a substantially continuous function of pulse width as a function of DC bus voltage and wherein the hysteresis mode provides a discontinuous function of pulse width as a function of DC bus voltage.

10. A method of dynamic braking in a motor drive having a DC bus communicating with an inverter providing controlled power to an electric motor, the motor drive including a resistor and a solid-state switching device connected in series with the resistor, wherein the solid-state switching device is configured to selectively connect the resistor across the DC bus, the method comprising the steps of:
   (a) below a threshold DC bus voltage, controlling the solid-state switching device in a first mode to switch the solid-state switching device at a first average rate to control an average time during which the resistor is connected across the DC bus; and
   (b) above the threshold DC bus voltage, controlling the solid-state switching device in a second mode to switch the solid-state switching device at a second average rate to control the average time during which the resistor is connected across the DC bus such that the average time which the resistor is connected across the DC bus is to be greater during the second mode than during the first mode.

11. The method of claim 10 wherein the first mode provides pulse width modulation of the solid-state switching device at a constant switching speed as a function of DC bus voltage and the second mode alternates at a lower switching speed between holding the solid-state switching device in an on-state and switching the solid-state switching device on and off at the constant rate.

12. The method of claim 10 wherein the first average rate is greater than 1 kHz and the second average rate is less than 1 kHz.

13. The method of claim 12 wherein the first average rate is substantially 2 kHz and the second average rate is substantially in a range of 50 to 200 Hz.

14. The method of claim 10 wherein a maximum duty cycle of the switching device in the first mode equals a minimum duty cycle of the switching device in the second mode.

15. The method of claim 10 wherein the solid-state switching device is turned off in a third mode at a second DC bus voltage less than the threshold DC bus voltage.

16. The method of claim 10 wherein a maximum duty cycle of the switching device in the first mode is substantially nine-tenths.

17. A method of dynamic braking in a motor drive having a DC bus communicating with an inverter providing controlled power to an electric motor, and further having a resistor and a solid-state switching device connected in series with the resistor, wherein the solid-state switching device is configured to selectively connect the resistor across the DC bus, the method comprising the steps of:
   (a) controlling the solid-state switching device in a hysteresis mode to connect the resistor and solid-state switching device across the DC bus for DC bus voltages above a predetermined threshold; and
   (b) controlling the solid-state switching device in a pulse width modulation mode to connect the resistor and solid-state switching device across the DC bus for DC bus voltages below a predetermined threshold, wherein the solid-state switching element is repeatedly switched on and off with an on-time being a function of DC bus voltage; and
   wherein the hysteresis mode is used for greater energy dissipation in the series connected resistor than the pulse width modulation mode.

18. The method of claim 17 wherein the pulse width modulation mode provides a substantially continuous function of pulse width as a function of DC bus voltage and wherein the hysteresis mode provides a discontinuous function of pulse width as a function of DC bus voltage.

19. The method of claim 17 further including a second motor drive having a second DC bus communicating with a second inverter providing control power to a second electric motor; and further a second series connected resistor and second solid-state switching device shunting the second DC bus, and wherein the DC bus and second DC bus are electrically interconnected for power-sharing; further including the steps of:
   (a) controlling the second solid-state switching device in a hysteresis mode wherein the second solid-state switching element is turned on for DC bus voltages above the predetermined threshold; and
   (b) controlling the second solid-state switching device in a pulse width modulation mode wherein the second solid-state switching element is repeatedly switched on and off with an on-time being a function of DC bus voltage for DC bus voltages below the predetermined threshold; and
   wherein the hysteresis mode is used for greater energy dissipation in the series connected resistor than the pulse width modulation mode.

* * * * *